United States Patent
Jia et al.

(10) Patent No.: US 6,799,536 B1
(45) Date of Patent: Oct. 5, 2004

(54) PET CHEWS AND METHODS OF MAKING PET CHEWS

(75) Inventors: Tiandong Jia, Somerset, NJ (US); Sharon McNamara, Kinnelon, NJ (US); Robert T. Sulikowski, Lumberton, NC (US)

(73) Assignee: The Hartz Mountain Corporation, Secaucus, NJ (US)

( * ) Notice: Subject to any disclaimer, the term of this patent is extended or adjusted under 35 U.S.C. 154(b) by 0 days.

(21) Appl. No.: 10/417,356

(22) Filed: Apr. 16, 2003

Related U.S. Application Data

(60) Provisional application No. 60/450,950, filed on Feb. 28, 2003.

(51) Int. Cl.[7] ................................................ A01K 29/00
(52) U.S. Cl. ....................................... 119/710; 119/709
(58) Field of Search ................................ 119/707, 709, 119/710; D30/160

(56) References Cited

U.S. PATENT DOCUMENTS

| | | | |
|---|---|---|---|
| 2,185,547 A | * | 1/1940 | Fowler ........................ 119/709 |
| 2,988,045 A | * | 6/1961 | Fisher ......................... 119/709 |
| 3,198,173 A | * | 8/1965 | Fisher ......................... 119/709 |
| 4,260,635 A | | 4/1981 | Fisher |
| 4,364,925 A | | 12/1982 | Fisher |
| D308,122 S | | 5/1990 | Markham et al. |
| 5,673,653 A | | 10/1997 | Sherrill |
| 6,217,408 B1 | | 4/2001 | Willinger |
| 6,277,420 B1 | | 8/2001 | Andersen et al. |
| 6,365,133 B1 | | 4/2002 | Rich |
| 6,584,938 B2 | * | 7/2003 | Sherrill et al. ............... 119/710 |
| 2003/0106500 A1 | * | 6/2003 | Kirch ......................... 119/710 |

* cited by examiner

*Primary Examiner*—Charles T. Jordan
*Assistant Examiner*—Elizabeth Shaw
(74) *Attorney, Agent, or Firm*—Gottlieb Rackman & Reisman, P.C.

(57) ABSTRACT

One embodiment of the present invention relates to a pet chew, comprising: a first layer including at least a portion of animal hide from a first species of animal; and a second layer including at least a portion of animal hide from a second species of animal; wherein the first layer and the second layer are arranged adjacent one another to form the pet chew; and wherein the first species of animal and the second species of animal are different. Another embodiment of the present invention relates to a pet chew, comprising: a first layer including at least a portion of animal hide from a first species of animal; and a second layer including at least a portion of animal hide from a second species of animal; wherein the first layer and the second layer are arranged adjacent one another to form the pet chew; wherein the first species of animal is bovine and the second species of animal is swine; and wherein the first layer and the second layer are rolled to form a generally cylindrical pet chew. Methods of making a pet chew are also disclosed.

22 Claims, 2 Drawing Sheets

PET CHEWS AND METHODS OF MAKING PET CHEWS

This application claims benefit of 60/450,950, filed Feb. 28, 2003.

FIELD OF THE INVENTION

One embodiment of the present invention relates to a pet chew, comprising: a first layer including at least a portion of animal hide from a first species of animal; and a second layer including at least a portion of animal hide from a second species of animal; wherein the first layer and the second layer are arranged adjacent one another to form the pet chew; and wherein the first species of animal and the second species of animal are different.

Another embodiment of the present invention relates to a pet chew, comprising: a first layer including at least a portion of animal hide from a first species of animal; and a second layer including at least a portion of animal hide from a second species of animal; wherein the first layer and the second layer are arranged adjacent one another to form the pet chew; wherein the first species of animal is bovine and the second species of animal is swine; and wherein the first layer and the second layer are rolled to form a generally cylindrical pet chew.

For the purposes of the present application the term "pet chew" is intended to refer to a chew object for any desired domesticated animal (including, but not limited to, a dog or a cat).

Further, for the purposes of the present application the term "hide" is intended to refer to the pelt or skin of an animal (as distinguished, for example, from the meat, bones, or cartilage of the animal).

BACKGROUND OF THE INVENTION

Pet chews (e.g., for a dog or cat) have been used to provide the pet an outlet for its natural chewing urge and/or to aid in cleaning the teeth of the pet. Such pet chews have conventionally been constructed of a synthetic material (e.g., polyurethane, latex, nylon), a plant by-product (e.g., rubber), or an animal by-product (e.g., rawhide).

Examples of such conventional pet chews include: (a) U.S. Pat. No. 5,673,653 to Sherrill (chew toys for domestic carnivorous animals and method for making same); (b) U.S. Pat. No. 5,186,124 to Woodford (tooth cleaning toy for cats and method for its manufacture); (c) U.S. Pat. No. 4,145,447 to Fisher, et al. (highly compacted animal food system); (d) U.S. Pat. No. 4,364,925 to Fisher (unitized animal food system product); (e) U.S. Pat. No. 4,260,635 to Fisher (unitized animal food system product); (f) U.S. Pat. No. 6,277,420 to Anderson, et al. (combination rawhide and formulated food pet chew); and (g) U.S. Pat. No. 6,365,133 to Rich (dog chew toy containing edible pet toothpaste for dental care).

Among those benefits and improvements that have been disclosed, other objects and advantages of this invention will become apparent from the following description taken in conjunction with the accompanying figures. The figures constitute a part of this specification and include illustrative embodiments of the present invention and illustrate various objects and features thereof.

DETAILED DESCRIPTION OF THE INVENTION

As required, detailed embodiments of the present invention are disclosed herein; however, it is to be understood that the disclosed embodiments are merely illustrative of the invention that may be embodied in various forms. In addition, each of the examples given in connection with the various embodiments of the invention are intended to be illustrative, and not restrictive. The figures are not necessarily to scale, some features may be exaggerated to show details of particular components. Therefore, specific structural and functional details disclosed herein are not to be interpreted as limiting, but merely as a basis for the claims and as a representative basis for teaching one skilled in the art to variously employ the present invention.

In summary, in one embodiment of the present invention a pet chew may be constructed of one layer formed of at least a portion of animal hide from a first species of animal and another layer formed of at least a portion of animal hide from a second, different species of animal.

Figure 1A:
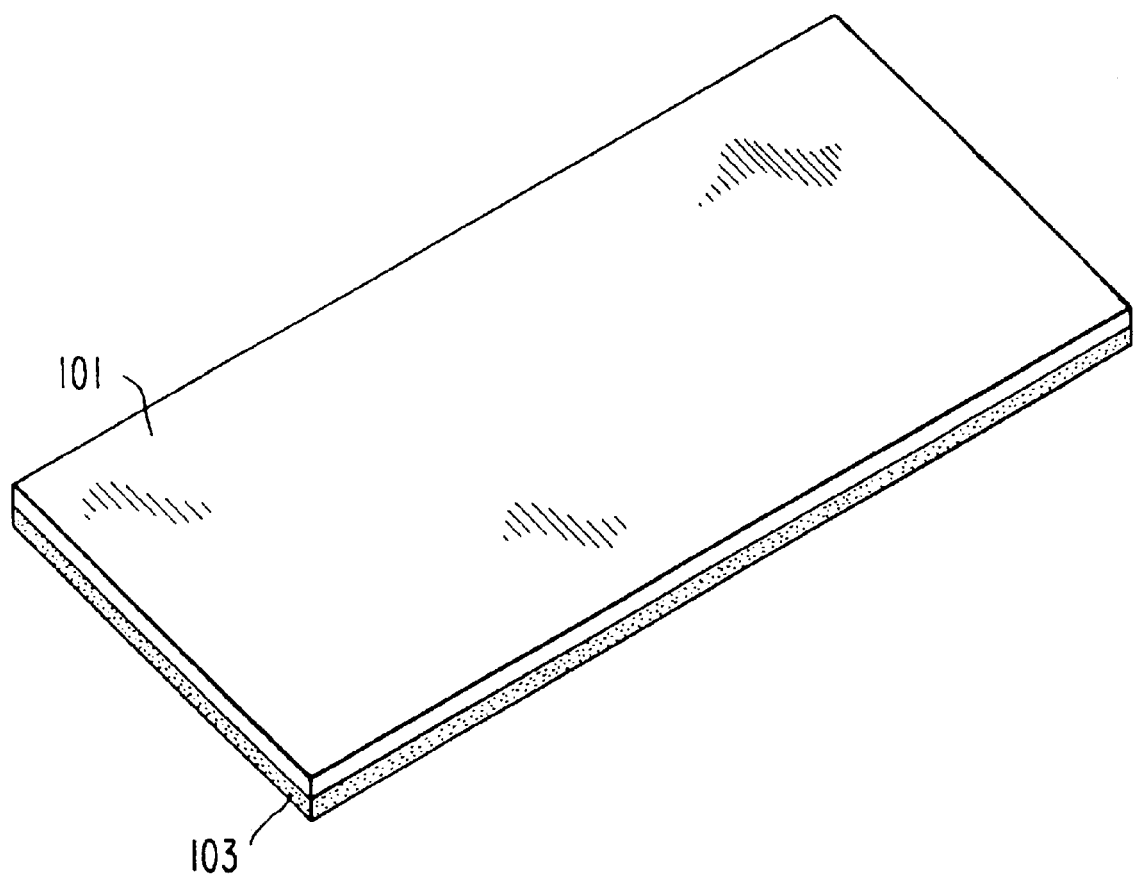
FIG. 1A shows a diagram of the components of a pet chew according to the present invention.

Referring now to FIG. 1A, a diagram of the components of a pet chew according to an embodiment of the present invention is shown. As seen in this FIG. 1A, First Layer 101, formed of a sheet of bovine hide (such as cow hide, for example) is disposed adjacent Second Layer 103, formed of a sheet of swine hide (such as pig hide, for example).

Figure 1B:
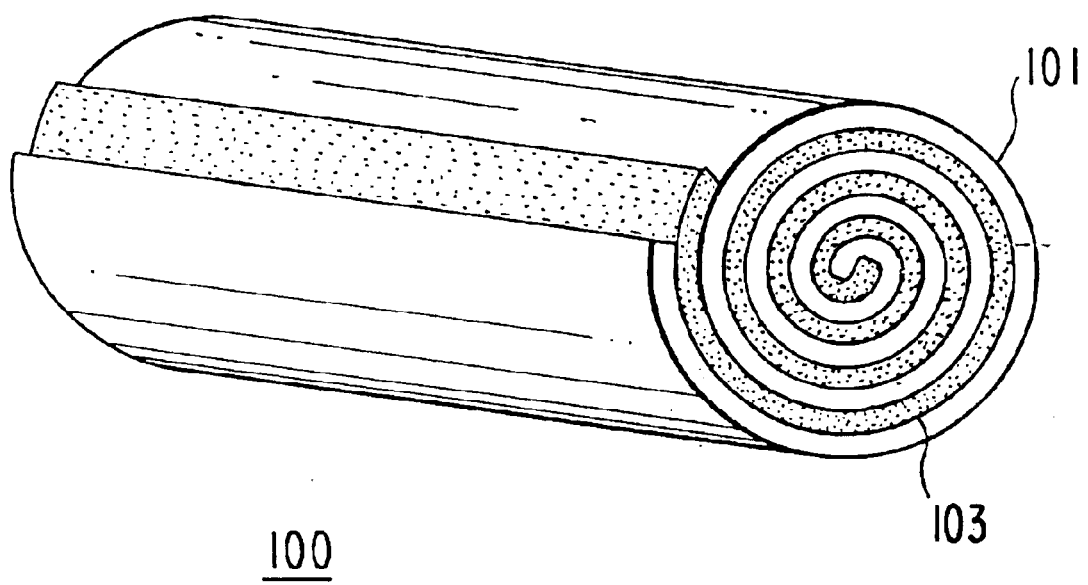
FIG. 1B shows a diagram of a pet chew utilizing the components shown in FIG. 1A.

Referring now to FIG. 1B, a diagram of Pet Chew 100 utilizing the components of FIG. 1A is shown. As seen in this FIG. 1B, First Layer 101 and Second Layer 103 have been rolled to form a generally cylindrical pet chew (of note, however, the pet chew may take other forms, as described elsewhere in the present application).

One example of a method of making an embodiment of the inventive pet chew (which example is intended to be illustrative and not restrictive) will now be described:

Cowhide Manufacturing Process

1. The bovine hides are received raw from the slaughterhouses.
2. Placed in drums and washed with running water.
3. Bleached with hydrogen peroxide.
4. Wringed (e.g., to reduce excess water).
5. Cut into required size/shape/form.

Pig Hide Manufacturing Process

1. The pig hides are frozen at the slaughterhouse.
2. Defrosted at the processing plant, washed and cleaned with running water.
3. Go through a whitening process (e.g., using hydrogen peroxide).
4. Cut into required size/shape/form.

Pet Chew Forming and Drying Process

1. The strips of cowhide and pig hide are put together and manufactured into the desired format (e.g., knotted bones, rolls, munchies, or twisters. The formed rawhide and pig hide is heated in ovens (e.g., for a number of days) until dry (in one example, a typical initial temperature may be about 45° C. and a typical final temperature may be about 85° C).
2. Pet Chews are classified by size and packed.

Referring now to Table 1, examples of typical compositions for a "knotted bone" and a "retriever roll" (which examples are intended to be illustrative and not restrictive) are:

TABLE 1

| PRODUCT | COW | PIG |
|---|---|---|
| 5–6" bone | 52% | 48% |
| 9" retriever | 58% | 42% |

In another embodiment of the present invention a first layer formed of at least a portion of animal hide from a first species of animal may have different characteristics (e.g., appearance, visual effect, texture, taste, flavor, color, palatability, chew longevity, nutritional composition from a second layer formed of at least a portion of animal hide from a second, different species of animal (thus providing different characteristics in a single pet chew).

While a number of embodiments of the present invention have been described, it is understood that these embodiments are illustrative only, and not restrictive, and that many modifications may become apparent to those of ordinary skill in the art. For example, while each layer has been described principally as being formed of bovine hide or swine hide, one or more of the layers may be formed of poultry hide, sheep hide, goat hide, rabbit hide, horse hide, and/or fish hide. The fish hide may be particularly attractive to felines, such as cats, and may be from a fish with relatively tough skin (e.g., a shark or ray). Further, each layer may include hide in sheet form, hide in piece form, hide in particle form, or a combination thereof. Further still, one or more of the layers may, of course, include other elements (such as hide from additional species of animal(s), meat from additional species of animal(s), coloring(s), flavoring(s), digestion aid(s), teeth cleaning elements), medicine(s), etc.). Further still, one or more of the layers may be basted (e.g., for flavor). Further still, the layers and/or completed pet chew may be held together by glue and/or other fasteners if desired. Further still, the pet chew according to the present invention may be assembled by hand, using automated machinery, or a combination thereof. Further still, hide from any desired species of animal may be on the "inside" of the pet chew with hide from another desired species of animal on the "outside" of the pet chew (e.g., a more chew-resistant layer may be on the outside with a less chew-resistant layer on the inside, a more visually appealing layer may be on the outside with a less visually appealing layer on the inside, etc.). Further still, the layers may be rolled, folded, and/or arranged in any other desired manner.

What is claimed is:

1. A pet chew, comprising:
   a first layer including at least a portion of animal hide from a first species of animal; and
   a second layer including at least a portion of animal hide from a second species of animal;
   wherein the first layer and the second layer are arranged adjacent one another to form the pet chew; and
   wherein the first species of animal and the second species of animal are different.

2. The pet chew of claim 1, wherein the first species of animal is bovine and the second species of animal is swine.

3. The pet chew of claim 2, wherein:
   (I) the hide of the animal of the first species is in a form selected from the group including: (a) sheet form; (b) piece form; and (c) particle form; and
   (II) the hide of the animal of the second species is in a form selected from the group including: (a) sheet form; (b) piece form; and (c) particle form.

4. The pet chew of claim 3, wherein the hide of the animal of the first species is in sheet form and the hide of the animal of the second species is in sheet form.

5. The pet chew of claim 1, wherein the first layer and the second layer are rolled together.

6. The pet chew of claim 5, wherein each end of the rolled layers is knotted.

7. The pet chew of claim 1, further comprising at least one additional layer arranged adjacent at least one of the first layer and the second layer.

8. The pet chew of claim 1, wherein at least one of the first layer and the second layer includes at least one of a flavoring additive and a coloring additive.

9. A pet chew, comprising:
   a first layer including at least a portion of animal hide from a first species of animal; and
   a second layer including at least a portion of animal hide from a second species of animal;
   wherein the first layer and the second layer are arranged adjacent one another to form the pet chew;
   wherein the first species of animal is bovine and the second species of animal is swine; and
   wherein the first layer and the second layer are rolled together.

10. The pet chew of claim 9, wherein:
    (I) the hide of the animal of the first species is in a form selected from the group including: (a) sheet form; (b) piece form; and (c) particle form; and
    (II) the hide of the animal of the second species is in a form selected from the group including: (a) sheet form; (b) piece form; and (c) particle form.

11. The pet chew of claim 10, wherein the hide of the animal of the first species is in sheet form and the hide of the animal of the second species is sheet form.

12. The pet chew of claim 9, wherein each end of the rolled layers is knotted.

13. The pet chew of claim 9, further comprising at least one additional layer arranged adjacent at least one of the first layer and the second layer.

14. The pet chew of claim 9, wherein at least one of the first layer and the second layer includes at least one of a flavoring additive and a coloring additive.

15. A method of making a pet chew, comprising:
    arranging a first layer and a second layer adjacent one another to form the pet chew;
    wherein the first layer includes at least a portion of animal hide from a first species of animal;
    wherein the second layer includes at least a portion of animal hide from a second species of animal; and
    wherein the first species of animal and the second species of animal are different.

16. The method of claim 15, wherein the first species of animal is bovine and the second species of animal is swine.

17. The method of claim 16, wherein:
    (I) the hide of the animal of the first species is in a form selected from the group including: (a) sheet form; (b) piece form; and (c) particle form; and
    (II) the hide of the animal of the second species is in a form selected from the group including: (a) sheet form; (b) piece form; and (c) particle form.

18. The method of claim 17, wherein the hide of the animal of the first species is in sheet form and the hide of the animal of the second species is sheet form.

19. The method of claim 15, wherein the first layer and the second layer are rolled together.

20. The method of claim 19, wherein each end of the rolled layers is knotted.

21. The method of claim 15, further comprising arranging at least one additional layer adjacent at least one of the first layer and the second layer.

22. The method of claim 15, wherein at least one of the first layer and the second layer includes at least one of a flavoring additive and a coloring additive.

* * * * *